(12) United States Patent
Kawashima et al.

(10) Patent No.: US 6,333,955 B1
(45) Date of Patent: Dec. 25, 2001

(54) CONTROL ROD AND MANUFACTURING METHOD FOR THE CONTROL ROD

(75) Inventors: Norio Kawashima, Mito; Yasuyuki Gotoh, Hitachinaka; Yasuhiro Aizawa, Hitachi; Akira Koizumi, Hitachi; Kouichi Machida, Hitachi; Yoshiharu Kikuchi, Hitachi, all of (JP)

(73) Assignees: Hitachi, Ltd., Tokyo; Hitachi Engineering Co., Ltd., Ibaraki, both of (JP)

( * ) Notice: Subject to any disclaimer, the term of this patent is extended or adjusted under 35 U.S.C. 154(b) by 0 days.

(21) Appl. No.: 09/492,130

(22) Filed: Jan. 27, 2000

(51) Int. Cl.$^7$ ............................................. G12C 7/06
(52) U.S. Cl. ..................... 376/233; 376/327; 376/229; 376/230; 376/228
(58) Field of Search ................... 376/233, 219, 376/226, 235, 228, 327, 229, 230; 403/331, 353, 363, 305, 311, 119, 309, 302; 49/404

(56) References Cited

U.S. PATENT DOCUMENTS

| | | | |
|---|---|---|---|
| 3,855,732 | * 12/1974 | Sheaf ..................................... | 49/425 |
| 5,592,520 | * 1/1997 | Ledford et al. ....................... | 376/233 |
| 5,883,931 | * 3/1999 | Holden et al. ........................ | 376/327 |
| 6,137,854 | * 10/2000 | Ueda et al. ........................... | 376/333 |

FOREIGN PATENT DOCUMENTS 61-05277   5/1986   (JP) .

* cited by examiner

*Primary Examiner*—Michael J. Carone
*Assistant Examiner*—Gabriel S Sukman
(74) *Attorney, Agent, or Firm*—Mattingly, Stanger & Malur, P.C.

(57) ABSTRACT

To reduce the manufacturing processes of a control rod and shorten the time required for manufacturing a control rod, for the lower part support member 7, the thin parts 11A and 11B are formed in the neighborhood of each of the left and right sides of the window 8. In the left and right sides of the pull-up handle 9, the grooves 17A and 17B are formed respectively. The groove 17B is deeper than the groove 17A. The thin part 11A is fitted into the groove 17A and the thin part 11B is fitted into the groove 17B. The gap formed between the end of the thin part 11B and the bottom of the groove 17B is larger than the gap formed between the end of the thin part 11A and the bottom of the groove 17A. Therefore, the thin part 11A can be simply fitted into the groove 17A.

5 Claims, 10 Drawing Sheets

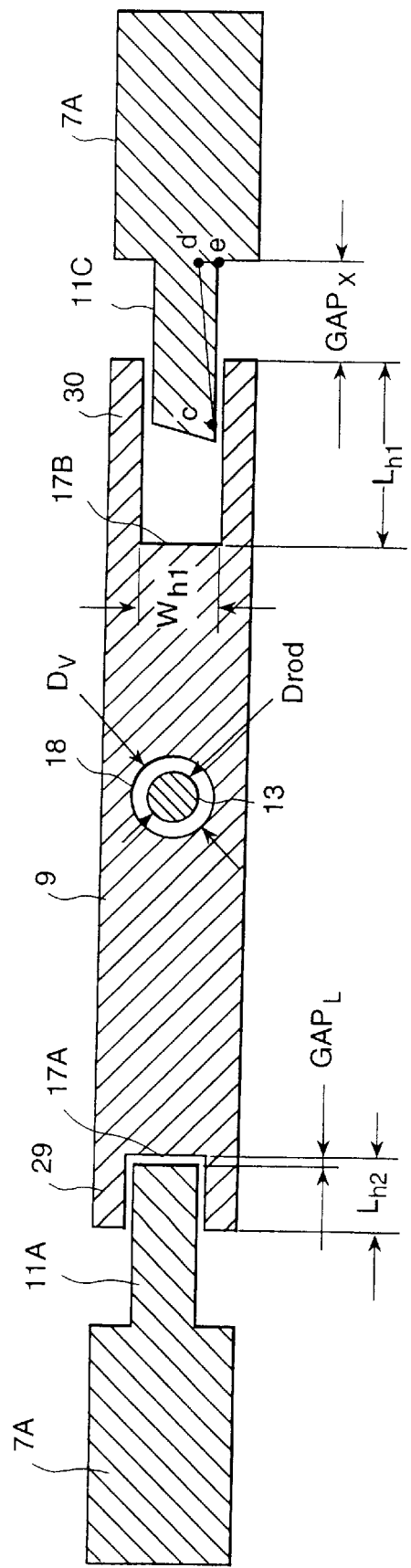

CONTROL ROD AND MANUFACTURING METHOD FOR THE CONTROL ROD

BACKGROUND OF THE INVENTION

The present invention relates to a control rod and more particularly to a control rod suitable for use in a boiling water type nuclear reactor.

A boiling water type nuclear reactor uses a control rod for reaction degree control of the reactor center. The control rod is composed of four blades of a neutron absorption material covered with a U-shaped stainless steel sheath which are arranged crosswise as shown in FIG. 5 of Japanese Patent Application Laid-Open 61-95277. The control rod is connected to the control rod derive unit and inserted into the reactor center by the drive operation of the control rod drive unit or pulled out from the reactor center.

The connection of the control rod to the control rode drive unit is executed as shown below. The pull-up handle provided on the control rod is pulled up, and the lock plug extended into the coupling socket provided at the lower end of the control rod is pulled up, and the coupling spud of the control rod drive unit is inserted into the coupling socket provided at the lower end of the control rod in this state, and the pull-up handle is lowered, and the lock plug is lowered. By doing this, the coupling spud is pressed against the coupling socket and the control rod is connected to the control rod drive unit.

The pull-up handle is provided on the lower part support member of the control rod as shown in FIG. 2 of Japanese Patent Application Laid-Open 61-95277. The structure in the neighborhood of the lower part support member on which the pull-up handle is provided will be explained in detail by referring to FIGS. 12 and 13.

The constitution in the neighborhood of the pull-up handle 12 of the control rod is shown in FIG. 12 and the section XIII—XIII is shown in FIG. 13. The pull-up handle 21 is inserted in the window provided in the lower part support member 7 and connected to the rod 13 inserted in the hole 18 with a nut. The thin parts 21A are formed on the left and right of the pull-up handle 21 and the thin parts 7A are formed in the neighborhood of each of the left and right sides facing on the window of the lower part support member 7. The thin parts 21A are fit between a pair of plates 22 attached to both sides of the thin parts 7A by spot welding 23 respectively. The plates 22 are welded to the thin parts 7A in the state that the ends of the thin parts 21A are opposite to the ends of the thin parts 7A. The pull-up handle 21 mounted inside the window will not be dislocated from the lower part support member 7 by the plates 22.

The aforementioned conventional control rod requires a pair of plates 22 and has many parts. It is necessary to weld the pair of plates 22, and there are many manufacturing processes, and it takes a lot of time to produce a control rod.

SUMMARY OF THE INVENTION

An object of the present invention is to provide a control rod reducing the manufacturing processes.

The characteristic of the first invention for accomplishing the above object is that the present invention comprises a lower part support member attached at the lower end of the blade unit structured by arranging a neutron absorbing material in the sheath member having a U-shaped cross section and a handle unit which is arranged in the through hole provided in the lower part support member, connected to the lower part support member on the left and right sides, and can slide in the axial direction of the control rod, and grooves are made in the left and right sides of the handle unit, and thin parts are formed on the left and right sides of the lower part support member facing on the through hole over the sliding range of the handle unit respectively, and the left and right thin parts are inserted individually in the left and right grooves respectively so as to connect the handle unit to the lower part support member, and in the perpendicular direction to the axial direction, the first gap formed between the end of one thin part and the bottom of the groove in which the end is inserted is larger than the second gap formed between the end of the other thin part and the bottom of the groove in which the end is inserted.

Since the first gap is larger than the second gap, one of the left and right grooves is deeper than the other one and one of the left and right thin parts can be easily fitted into one groove mentioned above. The other thin part can also be fitted into the other groove easily. No plates are required unlike the conventional one and the handle unit is not dislocated from the lower part support member due to both side walls where the grooves are formed. The first invention forms grooves, so that the conventional blades are not required and the number of parts of the control rod can be reduced, so that the manufacturing processes are reduced and the time required for manufacture of a control rod is shortened.

The characteristic of the second invention for accomplishing the above object is that the cross section shape of the thin part forming the first gap has an inclined plane extending from one opposite side to the other side at its end, and a dent is formed on the longer side so that it becomes deeper linearly toward the base of the thin part from the end of the longer side, and the movement control unit for controlling movement in the perpendicular direction to the shorter side of the handle unit is formed on the longer side and on the end side from the dent.

According to the second invention, when the thin part is to be fitted into the groove, one of the side walls forming the groove is inserted into the dent, so that even if the thin part is not made thinner, no interference is caused between the thin part and the inner surface of the groove and the thin part can be easily fitted into the groove. Since the thin part is not made thinner, the gap between the thin part and the groove is small and the handle unit moves little in the thickness direction of the thin part due to the existence of the movement control unit. Since the handle unit is prevented from projection, the insertability of the control rod between the fuel collectors in the reactor center is not impeded.

BRIEF DESCRIPTION OF THE DRAWINGS

FIG. 6 is a cross sectional view of the junction between a pull-up handle of a control rod which is another embodiment of the present invention with a lower part support member.

DETAILED DESCRIPTION OF THE PREFERRED EMBODIMENT

Figure 2:
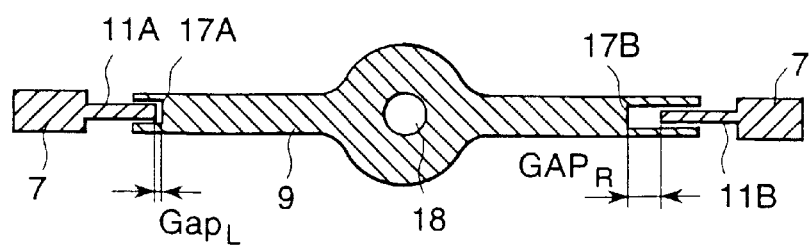
FIG. 2 is a cross sectional view of II—II shown in FIG. 1.
Figure 3:
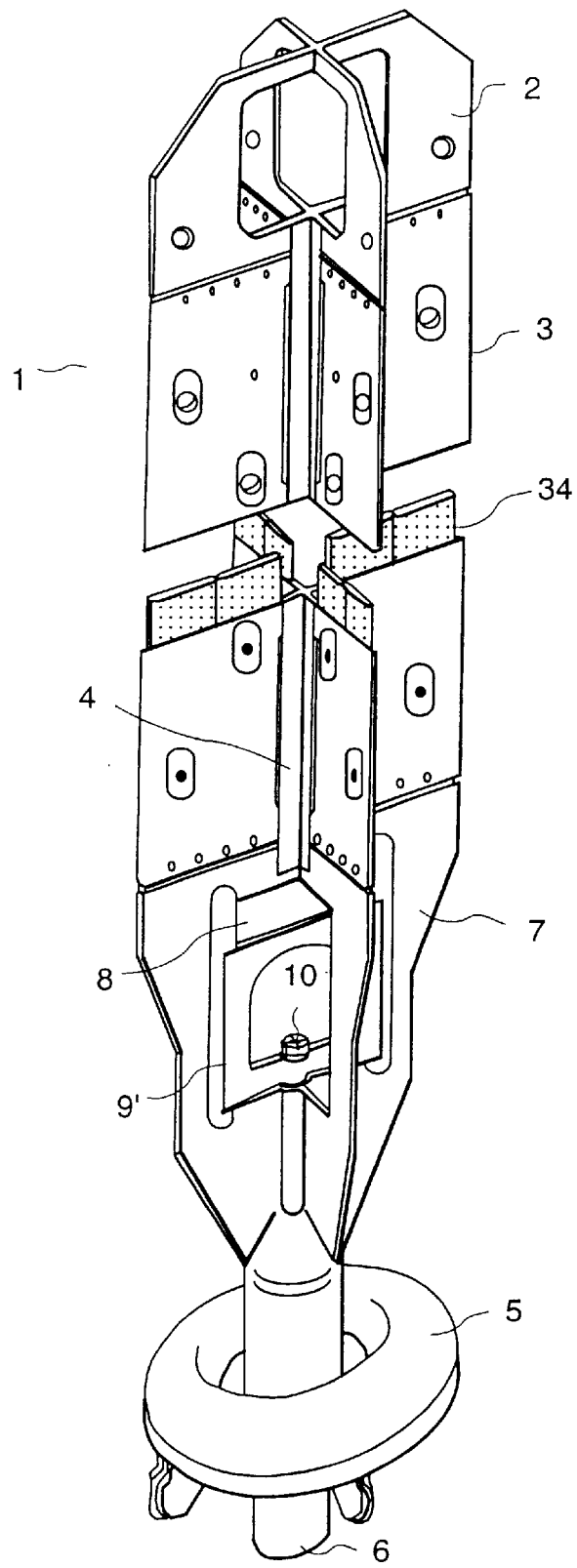
FIG. 3 is a perspective view of a control rod which is a suitable embodiment of the present invention.
Figure 4:
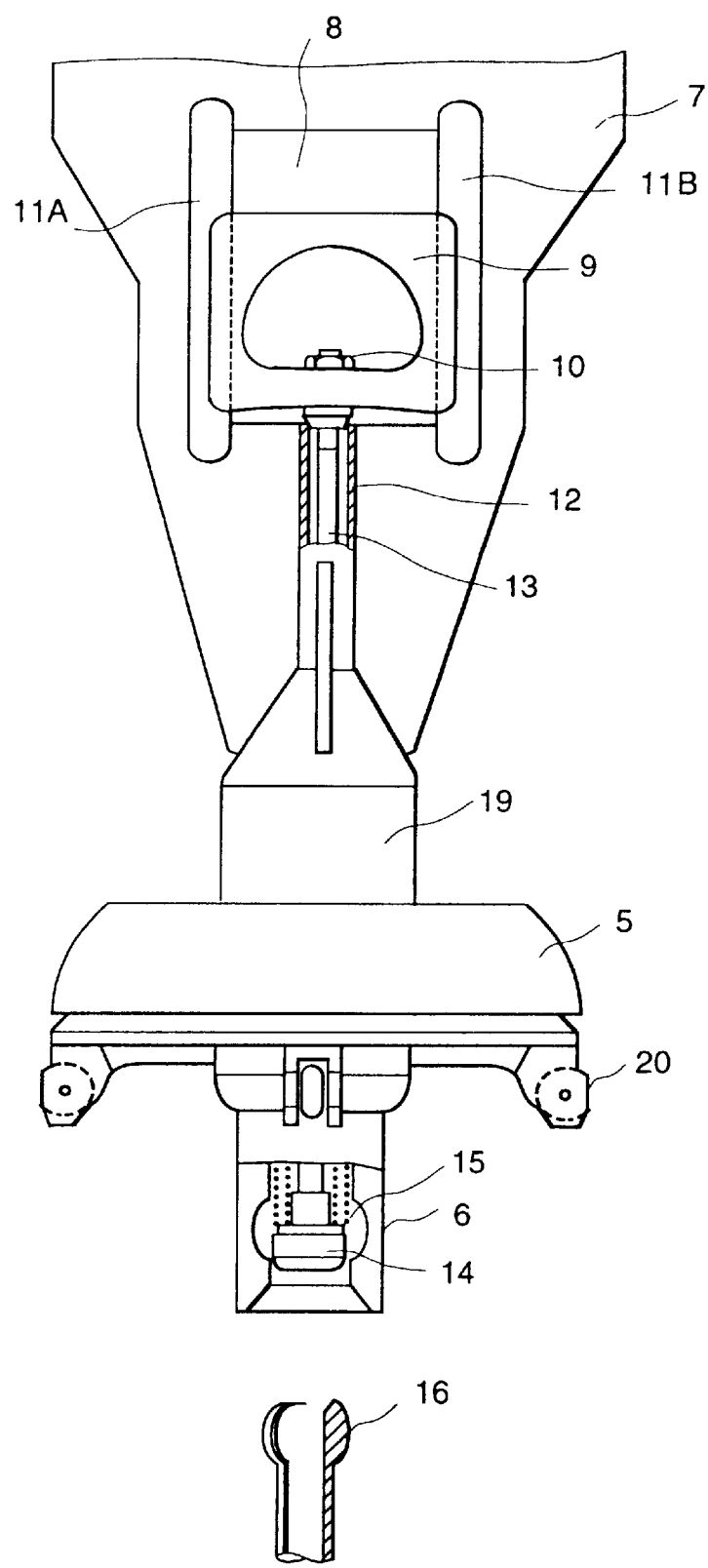
FIG. 4 is a detailed view in the lower part support member shown in FIG. 3.

The control rod which is a suitable embodiment of the present invention will be explained by referring to FIGS. 1 to 4. FIG. 3 shows a whole constitution of the control rod 1 of this embodiment. The control rod 1 is structured so that the four sheaths 3 of a U-shaped thin stainless steel plate are attached to the cross-shaped tie rod 4 arranged at the axial center of the control rod and in each sheath 3, the neutron absorption material (for example, hafnium) 34 is arranged. The pull-up handle 9 is attached to the upper end of the tie rod 4. The lower part support member 7 having a cross-shaped cross section is attached at the lower end of the tie rod 4. The lower end of each sheath 3 is attached to the lower part support member 7 by spot welding. The drop speed limiter 5 is provided at the lower end of the lower part support member 7. The coupling socket 6 is attached to the drop speed limiter 5. The window 8 which is a through hole is bored in the lower part support member 7. The pull-up handle 9 is arranged in the window 8.

The constitution of the lower part of the control rod 1 will be explained hereunder. The cylinder 12 is installed below the window 8 and at the axial center of the lower part support member 7. The cylinder 19 is installed at the lower end of the cylinder 12. The drop speed limiter 5 is attached to the cylinder 19. The drop speed limiter 5 is provided so as to control the speed when the control rod 1 drops inside the reactor center and control input of nuclear reaction even when the connection state of the control rod 1 and the control rod drive unit is released unexpectedly. The drop speed limiter 5 has a shape that a bowl is turned upside down, that is, a shape of a parachute and increases the flow resistance in the water and controls the drop speed of the control rod 1. The roller 20 is provided on the drop speed limiter 5.

The coupling socket 6 is provided on the cylinder 19 under the drop speed limiter 5. The coupling socket 6 has a cylindrical structure having a hollow on the inner surface. The hollow is structured so as to coincide with the shape of the swollen end of the coupling spud 16 of the control rod drive unit. The coupling spud 16 has a plurality of slits in the vertical direction and can expand and contract in the radius direction. The lock plug 14 arranged in the coupling socket 6 is provided on the rod 13. The rod 13 extends in the hole 18 (FIG. 2) bored in the pull-up handle 9 and the cylinders 19 and 12 and is connected to the pull-up handle 9 with the nut 10. The lock plug 14 is pressed down by the coil spring 15 provided in the coupling socket. As a result, the pull-up handle 9 is at the lowest position in the window 8 in the normal state.

The control rod 1 is connected to the control rod drive unit as shown below. The pull-up handle 9 is pulled up, and the lock plug 14 is lifted up, and the coupling spud 16 is inserted into the coupling socket 6 by driving by the control rod drive unit. Thereafter, when the lifting force of the pull-up handle 9 is canceled, the lock plug 14 is pressed down by the spring force of the coil spring 15 and enters the coupling spud 16. The coupling spud 16 is pressed and spread in the radius direction and adhered closely to the hollow in the coupling socket 6. By doing this, the control rod 1 is connected to the control rod drive unit. The control rod 1 can be separated from the control rod drive unit by lifting up the lock plug 14 and pulling out the coupling spud 16.

The connection state of the pull-up handle 9 and the lower part support member 7 in this embodiment will be explained by referring to FIGS. 1 and 2. In the lower part support member 7, the thin parts 11A and 11B are formed in the neighborhood of each of the left and right sides of the window 8. The thin parts 11A and 11B are formed at least within the sliding range of the pull-up handle 9 in the axial direction of the control axis 1. The width $L_{W2}$ of the thin part 11A and the width $L_{W1}$ (FIG. 8) of the thin part 11B in the horizontal direction are equal to each other. In the left and right sides of the pull-up handle 9, the grooves 17A and 17B are formed respectively. The depth $L_{h1}$ (FIG. 8) of the groove 17B is deeper than the depth $L_{h2}$ (FIG. 8) of the groove 17A. The horizontal width $L_{handle}$ (FIG. 8) of the pull-up handle 9 is larger than the width $L_{window}$ (FIG. 8) of the window 8. The respective distances of the thin parts 11A and 11B from the axial center of the control rod 1 are the same. The thin part 11A is fitted into the groove 17A and the thin part 11B is fitted in the groove 17B. The gap $Gap_R$ formed between the end of the thin part 11B and the bottom of the groove 17B is larger than the gap $Gap_L$ formed between the end of the thin part 11A and the bottom of the groove 17A. The pull-up handle 9 is connected to the lower part support member 7 as mentioned above, so that it slides up and down using them as guides.

Figure 5A:
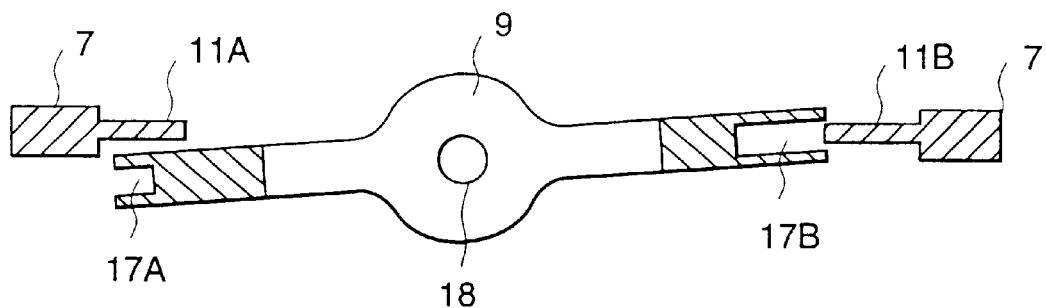
FIG. 5 is an illustration for showing the procedure for the mounting operation of the pull-up handle of the control rod shown in FIG. 3 to the lower part support member.
Figure 5B:
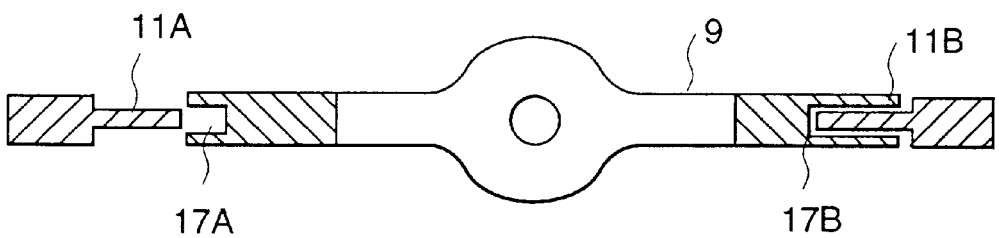
Figure 5C:
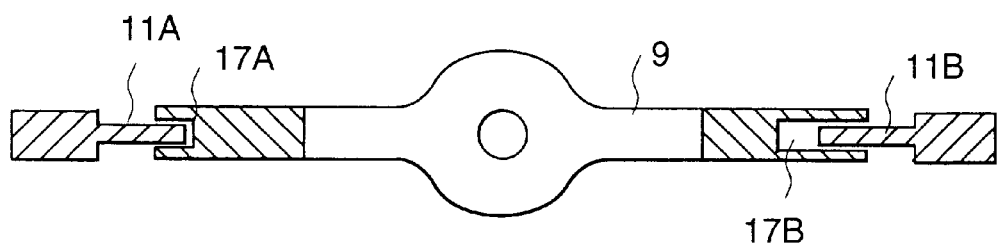
Figure 5D:
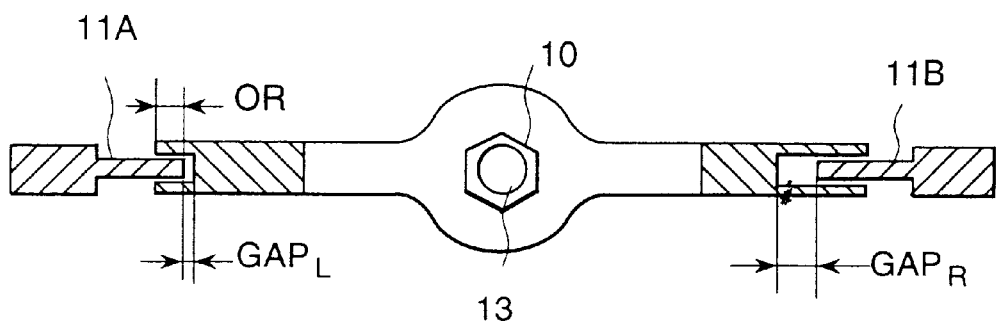

The mounting of the pull-up handle 9 to the thin parts 11A and 11B will be explained by referring to FIG. 5. The pull-up handle 9 is inclined at the predetermined angle against the side of the lower part support member 7 so that the groove 17B is set opposite to the end of the thin part 11B (FIG. 5A). The pull-up handle 9 is moved toward the thin part 11B until the end of the thin part 11B reaches the bottom of the groove 17B (FIG. 5B). The depth of the groove 17B is set so that the end of the thin part 11A is opposite to the opening of the groove 17A. Next, the pull-up handle 9 is moved toward the thin part 11A and the thin part 11A is fitted into the groove 17A (FIG. 5C). The rod 13 is inserted into the hole 18 of the pull-up handle 9, and the nut 10 is connected to the end of the rod 13, and the pull-up handle 9 is connected to the rod 13 (FIG. 5D). The minimum overlap length formed between the pull-up handle 9 and the thin parts 11A and 11B is set so as to be larger than the difference between the outer diameter of the rod 13 and the inner diameter of the cylinder 12.

According to this embodiment, the depth $L_{h1}$ of the groove 17B formed in the pull-up handle 9 is deeper than the depth $L_{h2}$ of the groove 17A, so that by fitting the thin part 11B into the groove 17B, the thin part 11A can be easily fitted into the groove 17A. By use of such a constitution, the number of parts is reduced compared with the conventional one and the structure of the control rod 1 in the neighborhood of the pull-up handle 9 is simplified. Furthermore, according to this embodiment, welding of the plates 22 is not necessary unlike the conventional one, so that the manufacturing processes of control rod 1 is reduced and the time required for manufacture of control rod 1 is also shortened. Since the pull-up handle 9 is attached to the rod 13, the pull-up handle 9 is not dislocated from the lower part support member 7. The pull-up handle 9 can easily slide up and down using the thin parts 11A and 11B as guides. Since the overlap length OR (equal to the overlap length between the pull-up handle 9 and the thin part 11B) between the pull-up handle 9 and the thin part 11A is set so as to be larger than the difference between the outer diameter of the rod 13 and the inner diameter of the cylinder 12, the pull-up handle 9 is prevented from dislocating from the lower part support member 7 during sliding.

From the viewpoint of the sliding object of the pull-up handle, it is possible that grooves corresponding to the grooves 17A and 17B are provided respectively in the left and right sides of the window 8 of the lower part support member 7, and thin parts corresponding to the thin parts 11A and 11B are provided respectively on the left and right of the pull-up handle, and each thin part of the pull-up handle is individually fitted into each groove provided in the lower part support member 7. Also by use of such a constitution, the effect of the aforementioned embodiment can be produced. Forming of grooves in both sides of the pull-up handle can be done more simply than forming of grooves in the left and right sides of the window 8.

Figure 7:
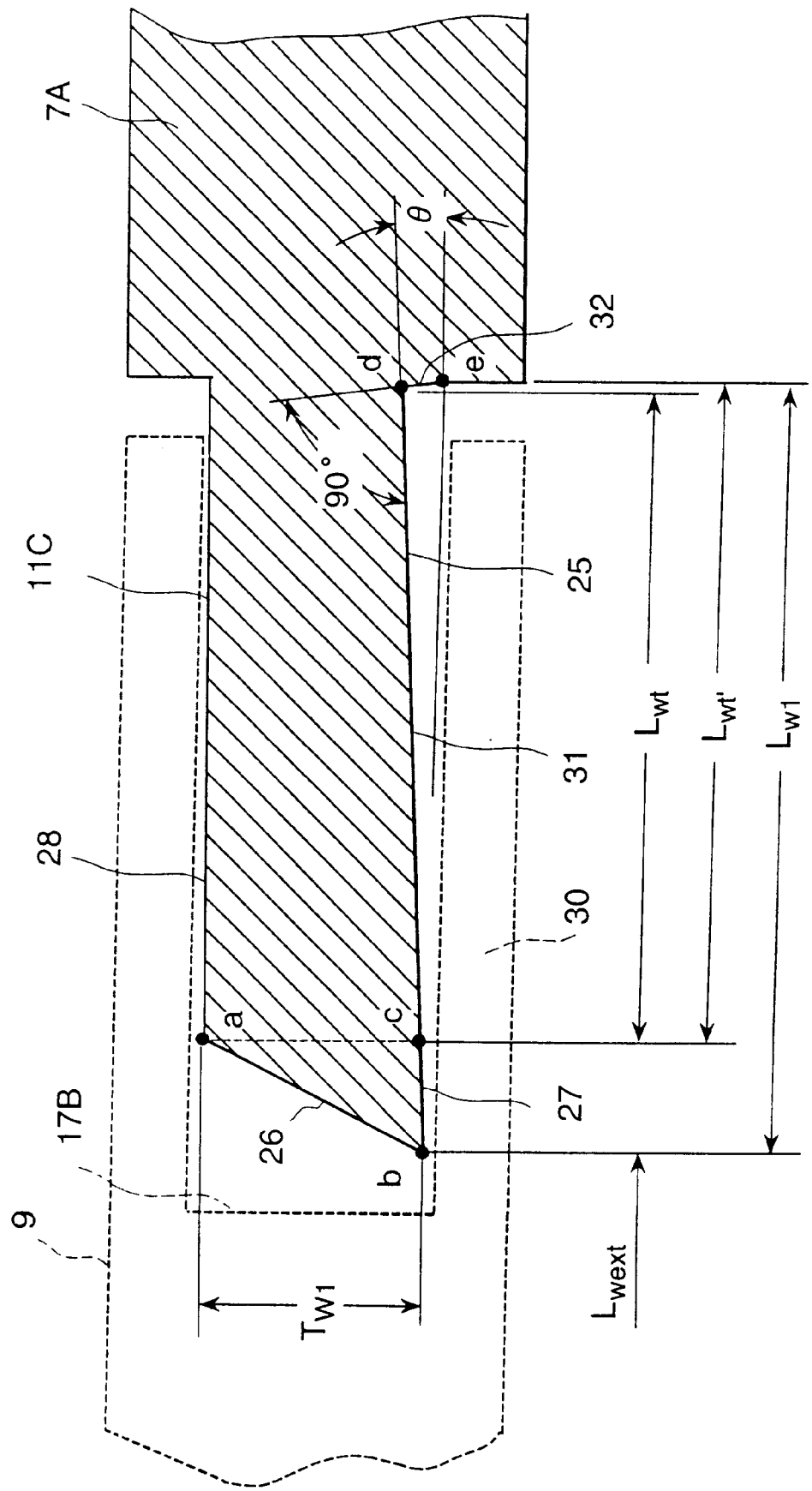
FIG. 7 is an enlarged view in the neighborhood of the thin part 11C shown in FIG. 6.

The control rod which is another embodiment of the present invention will be explained hereunder by referring to FIGS. 6 and 7. In the control rod of this embodiment, among the constitution of the control rod 1, the lower part support member 7A having the thin parts 11A and 11C on the left and right of the window 8 is provided in place of the lower part support member 7. Namely, the control rod of this embodiment has the same constitution as that of the control rod 1 except the lower part support member 7A. The lower part support member 7A has the same constitution as that of the lower part support member 7 except that the thin part 11B is replaced with the thin part 11C. The thin part 11C has the dent 25 formed on a part of the side. The dent 25 has a shape formed by the bottom 31 on the straight line extending from the point c on one side of the thin part 11C to the point d in the neighborhood of the base of the thin part 11C and the bottom 32 on the straight line extending from the base point e of the thin part 11C to the point d. The angle formed by the bottoms 31 and 32 is 90°. The bottom 31 is inclined at an angle of θ against the side where the point c of the thin part 11C exists. The height of the dent 25 (length in the axial direction of the control rod) is slightly higher than the height of the pull-up handle 9 and is required to be sufficiently high to insert the side wall 30 of the groove 17B.

The thin part 11C has an inclined plane 26 inclined from the point a on one side 28 toward the point b on the other side which is opposite to the point a at its end. The point a is the end of the side 28. The point b is also the end of the other side. The point c is on the other side and the line (the dashed line shown in FIG. 7) connecting the points a and b is perpendicular to the side 28. The part on the end side from the point c on the other side (the part from the point c to the point b) is the movement control part 27.

Figure 8:
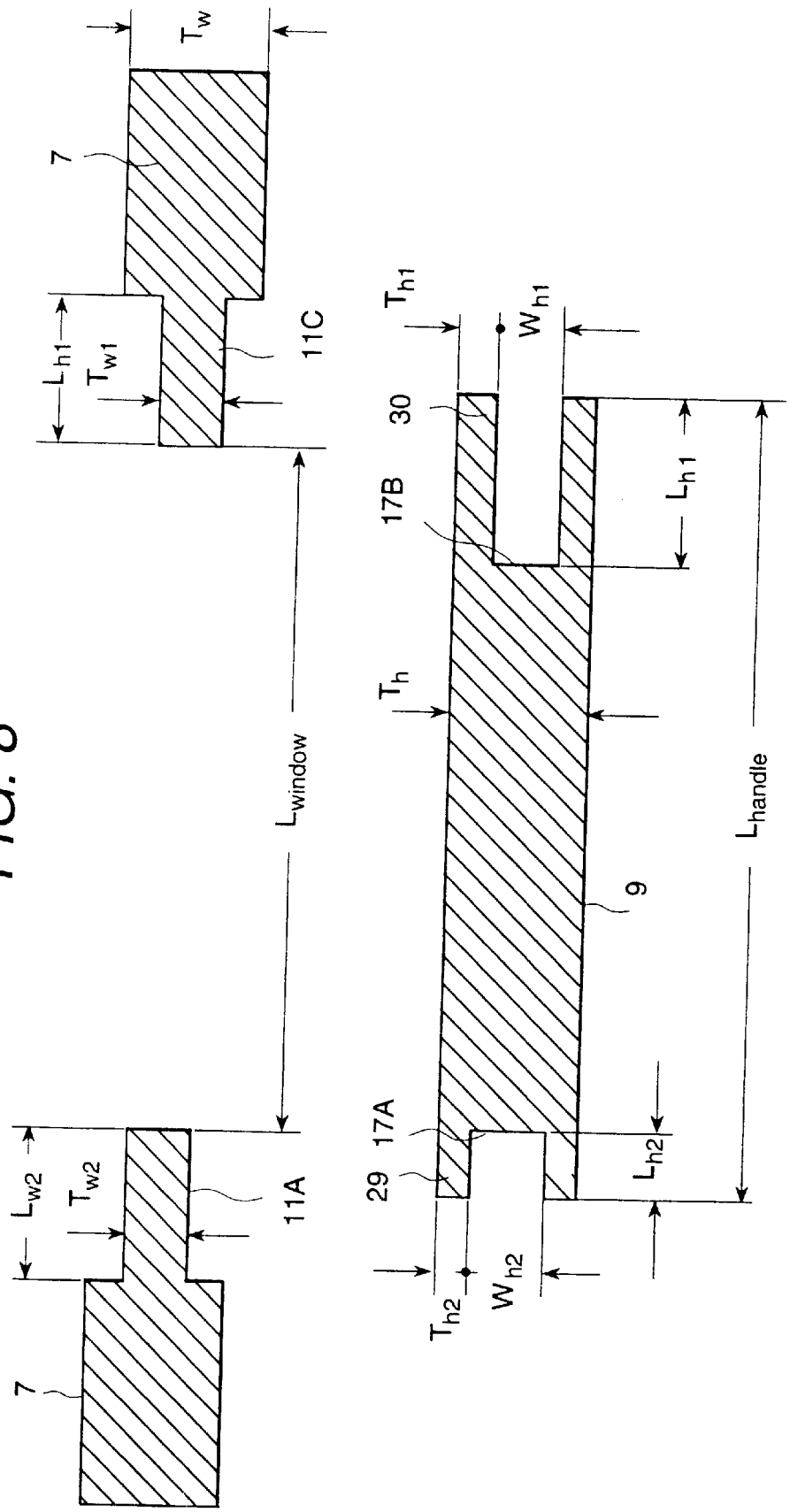
FIG. 8 is an illustration showing the size of each unit of a pull-up handle and a lower part support member.
Figure 9:
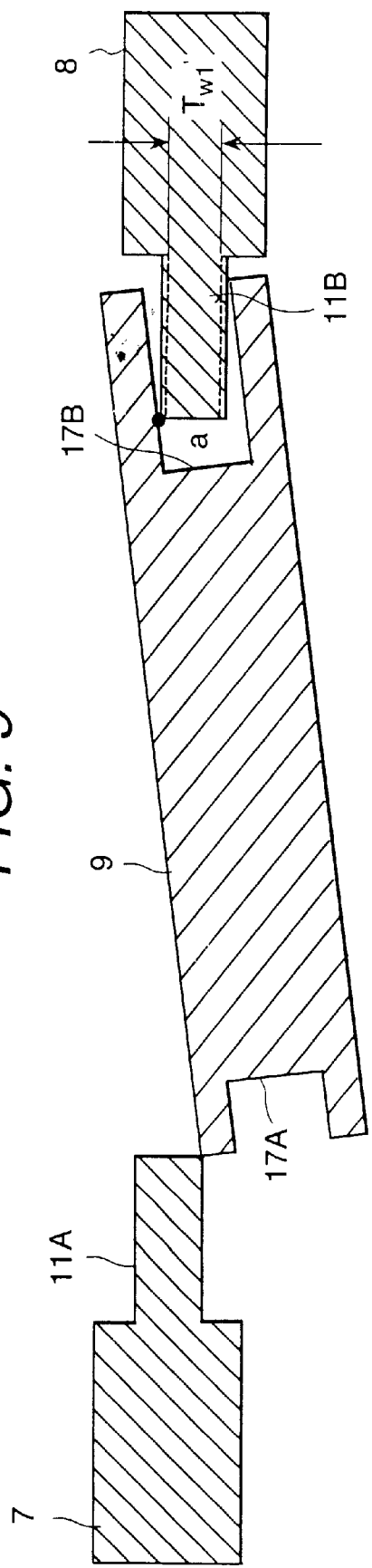
FIG. 9 is an illustration for explaining the problems when the pull-up handle of the control rod shown in FIG. 3 is mounted to the lower part support member.

As shown in FIG. 8, the horizontal width of the window 8 of the lower part support member 7A is assumed as $L_{window}$, the widths of the thin parts 11A and 11B in the horizontal direction as $L_{w2}$ and $L_{w1}$, the thicknesses of the thin parts 11A and 11B as $T_{w2}$ and $T_{w1}$, and the thickness of the lower part support member 7A as $T_w$. Furthermore, as shown in FIG. 8, the horizontal width of the pull-up handle 9 is assumed as $L_{handle}$, the thickness of the pull-up handle 9 as $T_h$, the depths of the grooves 17A and 17B as $L_{h2}$ and $L_{h1}$, the widths of the grooves 17A and 17B as $W_{h2}$ and $W_{h1}$, and the thicknesses of the side wall 29 of the groove 17A and the side wall 30 of the groove 17B as $T_{h2}$ and $T_{h1}$. The relationship of each unit shown in FIGS. 6 and 7 is represented as shown below using them.

The angle θ and the length $L_{wt}$ of the thin part 11B (FIG. 7) are expressed by Formula 1 and Formula 2. The length $L_{wt}'$ from the point c to the point e of the thin part 11B is expressed by Formula 3 using Formula 1 and Formula 2.

$$\theta = \tan^{-1}\frac{T_{w1} + T_{h1}}{L_{window}} \quad \text{(Formula 1)}$$

$$L_{wt} = L_{handle} \cdot \cos\theta - L_{window} \quad \text{(Formula 2)}$$

$$L_{wt'} = \frac{T_{wt}}{\cos^2\theta} \quad \text{(Formula 3)}$$

The width $Lw_{w1}$ of the thin part 11B, the depths $L_{h2}$ and $L_{h1}$ of the grooves 17A and 17B, and the width $W_{h1}$ of the groove 17B are expressed by Formula 4, Formula 5, Formula 6, and Formula 7.

$$L_{w1} = L_{wt} + L_{wext} \quad \text{(Formula 4)}$$

$$L_{h1} = \frac{L_{wt} + L_{wext}}{\cos\theta} \quad \text{(Formula 5)}$$

$$L_{h2} = \frac{L_{handle} - L_{window}}{2} + Gap_L \quad \text{(Formula 6)}$$

$$W_{h1} = T_{w1} + 2 \cdot Gap_T \quad \text{(Formula 7)}$$

The length $Gap_x$ between the end of the side wall 30 and the base of the thin part 11B in the state that the pull-up handle 9 is attached to the rod 13 is expressed by Formula 8.

$$Gap_x = \frac{L_{window} - L_{handle}}{2} + L_{WI} < L_{wt'} \quad \text{(Formula 8)}$$

Assuming the inner diameter of the cylinder 12 as $D_v$ and the outer diameter of the rod 13 as $D_{rod}$, the overlap length OR between the pull-up handle 9 and the thin part 11A is expressed by Formula 9. As expressed by Formula 10, the value obtained by subtracting the depth $L_{h1}$ of the groove 17B from ½ of the width $L_{handle}$ of the pull-up handle 9 is larger than ½ of the width $W_{window}$ (FIG. 1) of the window 33 of the pull-up handle 9.

$$OR = L_{h2} - Gap_L > D_V - D_{rod} \quad \text{(Formula 9)}$$

$$\frac{L_{handle}}{2} - L_{h1} > \frac{W_{handle}}{2} \quad \text{(Formula 10)}$$

When Formula 8, Formula 9, and Formula 10 are replaced respectively, Formula 11, Formula 12, and Formula 13 are obtained. When each size is set so as to make the coefficients shown by Formula 11, Formula 12, and Formula 13 smaller than 1.0, the most suitable shape producing the effect of this embodiment is obtained.

$$kk_1 = \frac{Gap_x}{L_{wt'}} < 1.0 \qquad \text{(Formula 11)}$$

$$k_2 = \frac{D_v - D_{rod}}{L_{h2} - Gap_L} < 1.0 \qquad \text{(Formula 12)}$$

$$k_3 = \frac{\frac{W_{handle}}{2}}{\frac{L_{handle}}{2} - L_{h1}} < 1.0 \qquad \text{(Formula 13)}$$

Figure 1:
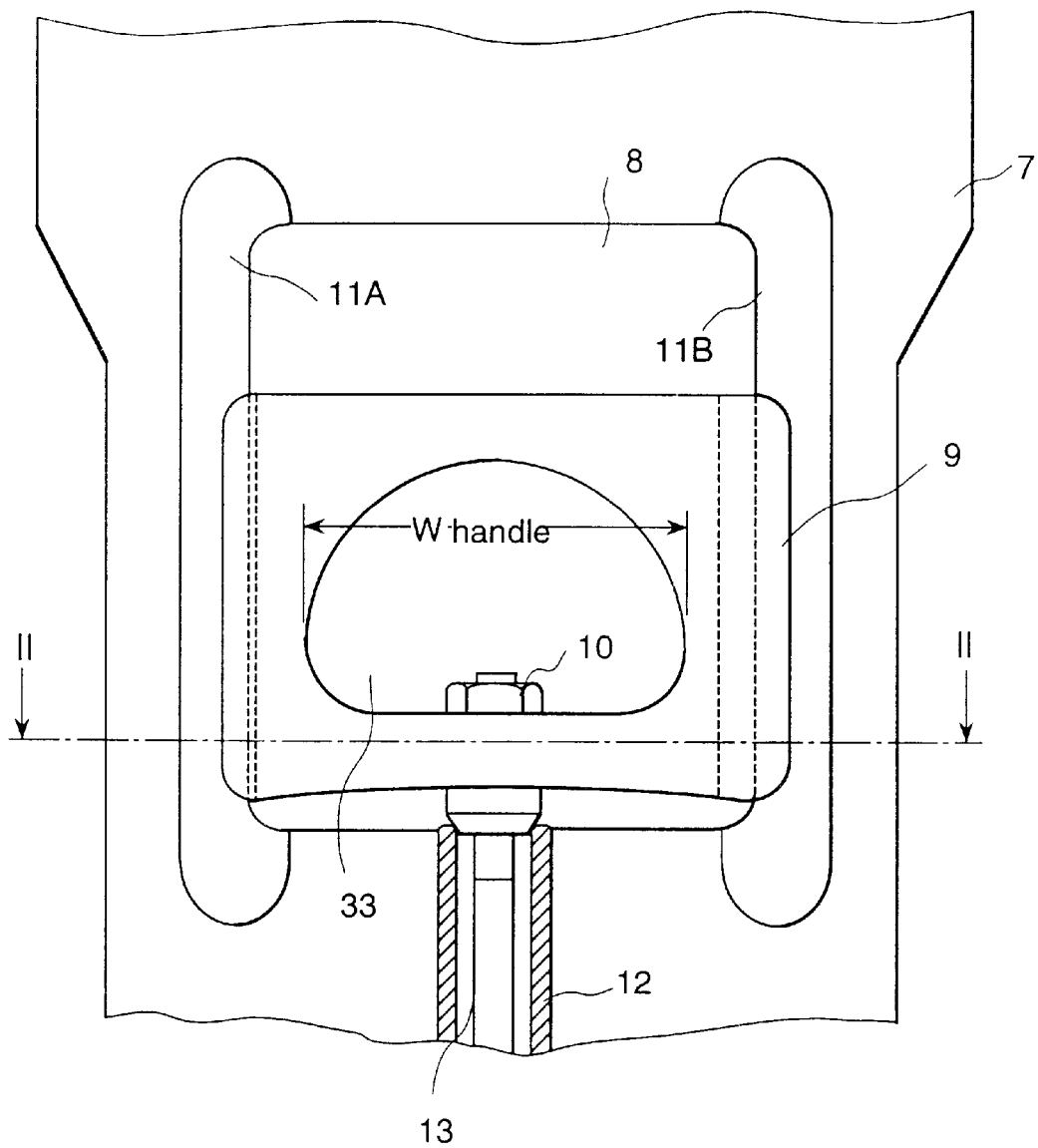
FIG. 1 is an enlarged view in the neighborhood of the pull-up handle shown in FIG. 4.

In the embodiment shown in FIG. 1, it is necessary to incline the pull-up handle 9 and fit the thin part 11B into the groove 17B. However, when the thickness $T_{w1}$ of the thin part 11B is thicker, the angle a at the end of the thin part 11B interferes with the inner surface of the groove 17B and the thin part 11B cannot be fitted into the groove 17B. To avoid it, it is necessary to make the thickness $T_{w1}$ of the thin part 11B thinner to $T_{wt'}$ at which the thin part 11B can be fitted into the groove 17B. However, when the thin part 11B is made thinner, in the state that the thin part 11B is fitted into the groove 17B, the gap formed between the side of the thin part 11B and the inner surface of the groove 17B becomes larger. When the gap is large, the distance that the pull-up handle 9 can move in the direction of the thickness of the thin part 11B increases. Then, the possibility that the pull-up handle 9 projects from the side of the lower part support member 7A increases and there is the possibility that when the control rod is moved up and inserted between the fuel collectors in the reactor center, the projected pull-up handle 9 impedes the insertability of the control rod.

Figure 10:
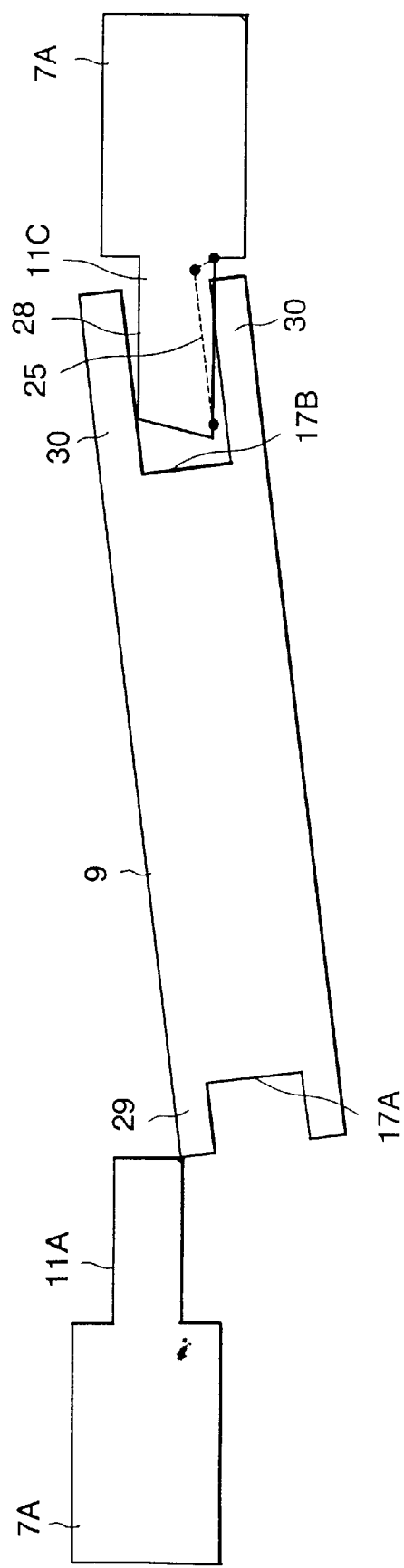
FIG. 10 is a drawing for explaining the mounting of the pull-up handle of the control rod shown in FIG. 6 on the lower part support member.

According to this embodiment, to obtain the effect produced by the control rod 1 shown in FIG. 1 and solve the aforementioned problem of insertability, the thin part 11C in which the dent 25 is formed is provided in the lower part support member 7A. The fitting operation of the thin part 11C into the groove 17B when the dent 25 is formed will be explained by referring to FIG. 10. At the stage that the pull-up handle 9 is inclined and the thin part 11C is fitted into the groove 17B, one side wall 30 of the groove 17B is inserted into the dent 25 of the thin part 11C. By providing the dent 25, unless the end a of the side 28 interferes with the inner surface of the groove 17B, the thin part 11C can be fitted sufficiently into the groove 17B. As a result, the end of the side wall 29 of the groove 17A can be inserted into the window 8 without being interrupted by the end of the thin part 11A and the thin part 11A can be fitted into the groove 17A. By providing the dent 25, it is not necessary to make the thin part 11C thinner and the gap width formed between the side of the thin part 11C and the inner surface of the groove 17B is small. Since the gap width is small and the movement control unit 27 is formed, the projection distance of the pull-up handle 9 from the side of the lower part support member 7A is extremely small. As a result, the insertability of the control rod of this embodiment between the fuel collectors in the reactor center becomes satisfactory.

Figure 11:
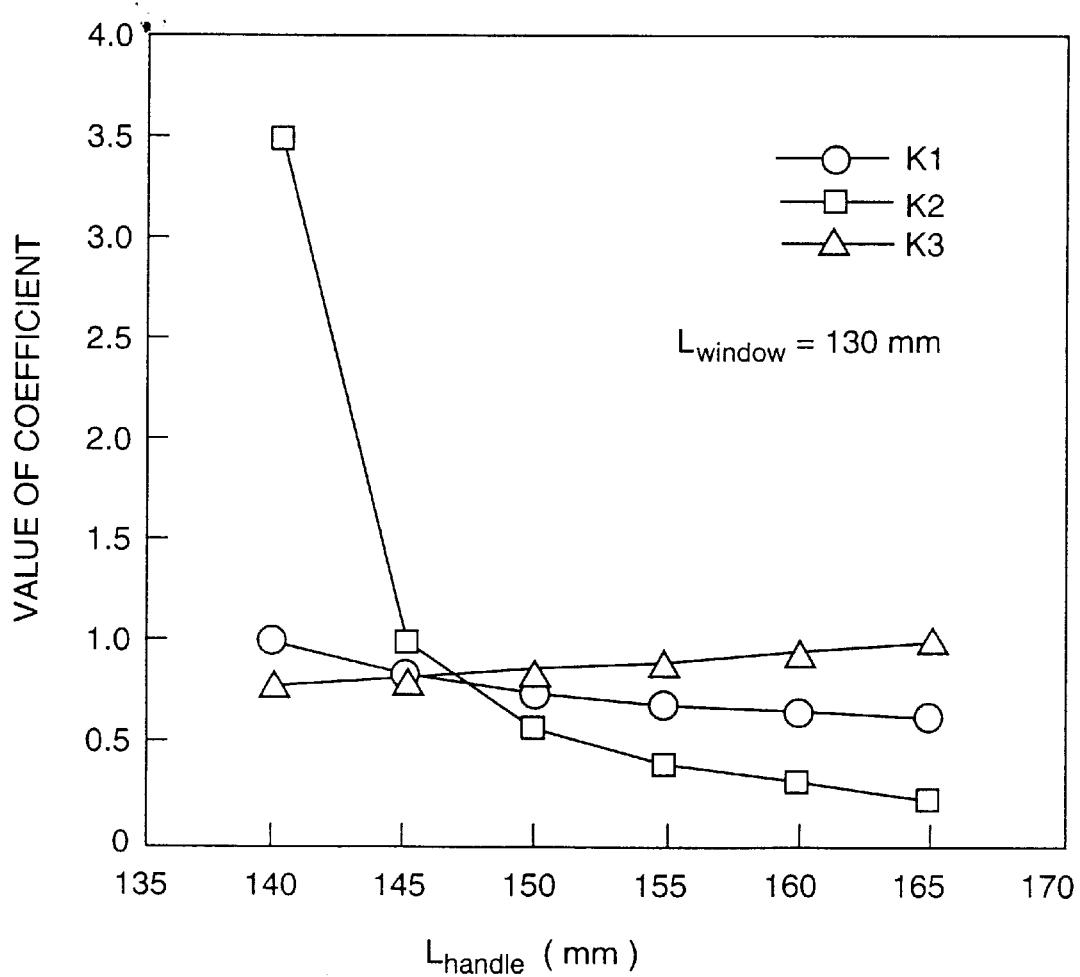
FIG. 11 is a characteristic drawing showing the relationship between the width $L_{handle}$ of the pull-up handle of the control rod shown in FIG. 3 and the value of each coefficient.
Figure 12:
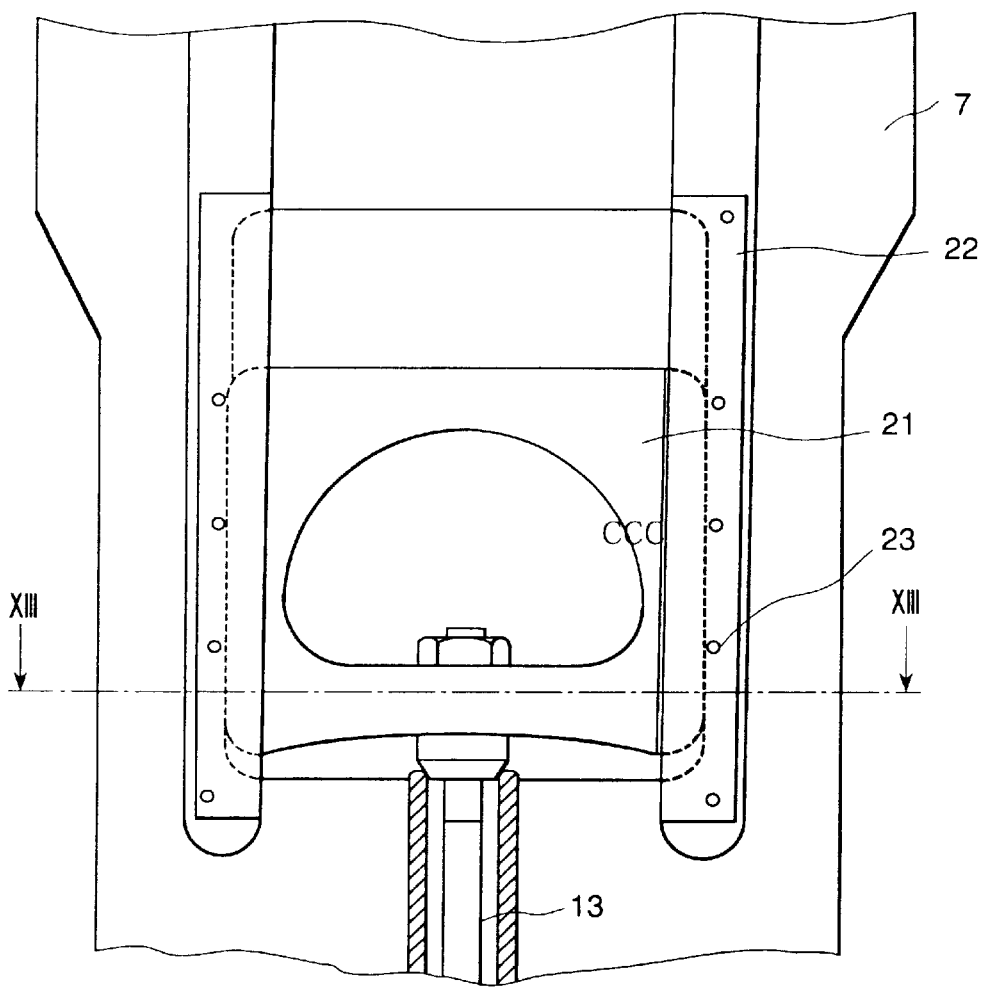
FIG. 12 is a schematic view of a pull-up handle of a conventional control rod.
Figure 13:
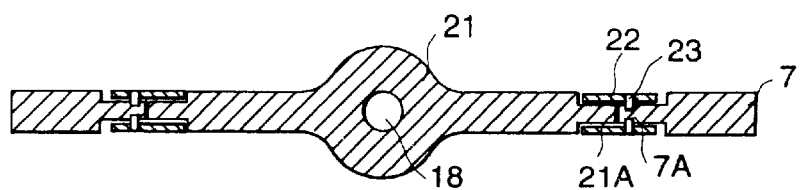
FIG. 13 is a cross sectional view of XIII—XIII shown in FIG. 12.

When $L_{window}$ is 130 mm, and $T_{w1}$ is 3.5 mm, and $T_{h1}$ is 1 mm, and $L_{wext}$ is 5 mm, and $Gap_L$ is 2 mm, and $Gap_T$ is 0.5 mm, and $D_v$ is 13.5 mm, and $D_{rod}$ is 10 mm, and $W_{handle}$ is 87 mm, the relationship between the width $L_{handle}$ of the pull-up handle 9 and the coefficients $k_1$, $k_2$, and $k_3$ is shown in FIG. 11. When the width $L_{handle}$ of the pull-up handle 9 increases, the coefficients $k_1$ and $k_2$ reduce and the coefficient $k_3$ increases. In this example, the most suitable range of the width $L_{handle}$ of the pull-up handle 9 is the range from 145 mm to 165 mm. When 150 mm is selected for the width $L_{handle}$, the size of each unit is shown below. θ is 1.98°, and $L_{wt}$ is 19.91 mm, and $L_{wt'}$ is 19.93 mm, and $L_{w1}$ is 24.93 mm, and $L_{h1}$ is 24.93, and $L_{h2}$ is 8 mm, and $W_{h1}$ is 4 mm.

According to the first invention, the number of parts of control rod can be reduced, so that the manufacturing processes are reduced and the time required for manufacture of control rod is shortened.

According to the second invention, even if the thin part is not made thinner, the thin part does not interfere with the inner surface of the groove and the thin part can be fitted into the groove easily. Since the projection distance of the handle from the side of the lower part support member can be made extremely small, the insertability of the control rod between the fuel collectors in the reactor center becomes satisfactory.

What is claimed is:

1. A control rod comprising a blade unit structured by arranging a neutron absorbing material in a sheath member having a U-shaped cross section, a lower part support member attached at the lower end of said blade unit, a handle unit which is arranged in a through hole provided in said lower part support member, connected to said lower part support member on the left and right sides, and can slide in the axial direction of said control rod, a coupling socket unit in which a connector of a control rod drive unit is inserted, and a lock plug which is arranged in said coupling socket unit, connected to said handle unit, extended in said axial direction, and connects or disconnects said connector and said coupling socket unit by operating said handling unit, wherein grooves are made in the left and right sides of said handle unit, and thin parts are formed on the left and right sides of said lower part support member facing on said through hole over the sliding range of said handle unit respectively, and said left and right thin parts are inserted individually in said left and right grooves respectively so as to connect said handle unit to said lower part support member, and in the perpendicular direction to said axial direction, a first gap formed between the end of one thin part and the bottom of said groove in which said end is inserted is larger than a second gap formed between the end of said other thin part and the bottom of said groove in which said end is inserted.

2. A control rod comprising a blade unit structured by arranging a neutron absorbing material in a sheath member having a U-shaped cross section, a lower part support member attached at the lower end of said blade unit, a handle unit which is arranged in a through hole provided in said lower part support member, connected to said lower part support member on the left and right sides, and can slide in the axial direction of said control rod, a coupling socket unit in which a connector of a control rod drive unit is inserted, and a lock plug which is arranged in said coupling socket unit, connected to said handle unit, extended in said axial direction, and connects or disconnects said connector and said coupling socket unit by operating said handling unit, wherein thin parts are formed on the left and right sides of said handle unit, and grooves are formed in the left and right sides of said lower part support member facing on said through hole over the sliding range of said handle unit respectively, and said left and right thin parts are inserted individually in said left and right grooves respectively so as to connect said handle unit to said lower part support member, and in the perpendicular direction to said axial direction, a first gap formed between the end of one thin part and the bottom of said groove in which said end is inserted is larger than a second gap formed between the end of said other thin part and the bottom of said groove in which said end is inserted.

3. A control rod according to claim 1 wherein said one groove is deeper than said other groove.

4. A control rod according to claim 1, wherein the cross section shape of said thin part forming said first gap has an inclined plane extending from one opposite side to the other side at its end, and a dent is formed on the longer side so that it becomes deeper linearly toward the base of said thin part from the end of said longer side, and a movement control unit for controlling movement in the perpendicular direction to the shorter side of said handle unit is formed on said longer side and on the end side from said dent.

5. A method for manufacturing a control rod stated in claim 1 characterized in that said thin part for forming said first gap is inserted into said groove for forming said first gap, and said thin part for forming said second gap is set opposite to said groove for forming said second gap, and thereafter, said thin part for forming said second gap is inserted into said groove for forming said second gap, and said handle unit is attached to said lock plug.

* * * * *